United States Patent
Shaga et al.

(10) Patent No.: US 10,760,928 B1
(45) Date of Patent: Sep. 1, 2020

(54) PLANAR LINEAR INDUCTIVE POSITION SENSOR HAVING EDGE EFFECT COMPENSATION

(71) Applicant: Microsemi Corporation, Chandler, AZ (US)

(72) Inventors: Ganesh Shaga, Warangal (IN); Bala Sundaram Nauduri, Hyderabad (IN); Sudheer Puttapudi, Hyderabad (IN)

(73) Assignee: Microsemi Corporation, Chandler, AZ (US)

( * ) Notice: Subject to any disclaimer, the term of this patent is extended or adjusted under 35 U.S.C. 154(b) by 23 days.

(21) Appl. No.: 16/282,284

(22) Filed: Feb. 21, 2019

(51) Int. Cl.
*G01D 5/20* (2006.01)
(52) U.S. Cl.
CPC ........... *G01D 5/2073* (2013.01); *G01D 5/204* (2013.01); *G01D 5/2053* (2013.01)
(58) Field of Classification Search
CPC .... G01D 5/2073; G01D 5/204; G01D 5/2053; G01D 5/2258; G01P 3/42; G01B 7/003; G01B 7/14; G01B 7/30
USPC ......................................................... 324/207
See application file for complete search history.

(56) References Cited

U.S. PATENT DOCUMENTS

| 4,737,698 A | 4/1988 | McMullin et al. | |
|---|---|---|---|
| 2006/0119351 A1* | 6/2006 | James | G01D 5/204 324/207.17 |
| 2006/0125472 A1* | 6/2006 | Howard | G01D 5/2086 324/207.24 |
| 2007/0001666 A1 | 1/2007 | Lee | |
| 2019/0195963 A1* | 6/2019 | Qama | G06F 30/392 |

FOREIGN PATENT DOCUMENTS

| EP | 2145158 A2 | 1/2010 |
|---|---|---|
| GB | 2394293 A | 4/2004 |

OTHER PUBLICATIONS

PCT/US2019/044245, International Search Report and Written Opinion of the International Searching Authority, International Search Authority, dated Nov. 15, 2019.
"Inductive Sensor Coil Design Using LX3301A", AN-S1412 Application Note, Microsemi Corporate Headquarters, One Enterprise, Aliso Viejo, CA 92656 USA, Nov. 2017.

* cited by examiner

*Primary Examiner* — Jay Patidar
(74) *Attorney, Agent, or Firm* — Glass and Associates; Kenneth Glass

(57) ABSTRACT

A planar linear inductive position sensor is formed on a substrate and includes at least one oscillating coil, a first sensing coil having opposing edges extending beyond opposing edges of the oscillating coil along a linear axis along which a linear position of a conductive target is to be sensed, and a second sensing coil having opposing edges extending beyond opposing edges of the oscillating coil along the linear axis. The first and second sensing coils have geometries selected such that equal opposing magnetic fields are induced in the first and second sensing coils in the presence of a magnetic field generated by the oscillating coil when no conductive target is proximate to the first and second sensing coils and unequal opposing magnetic fields are induced in the first and second sensing coils when the conductive target is proximate to the first and second sensing coils, a difference in the unequal opposing magnetic fields induced in the first and second sensing coils correlated to the position of the conductive target.

15 Claims, 6 Drawing Sheets

PLANAR LINEAR INDUCTIVE POSITION SENSOR HAVING EDGE EFFECT COMPENSATION

The present invention relates to position sensing technology and to inductive position sensing technology. More particularly, the present invention relates to a planar linear inductive position sensor having edge effect compensation.

BACKGROUND

Position sensors are a common element in automotive, industrial, and aerospace applications. Whenever safety is a concern, it is an absolute must that highly robust and reliable position sensors are required. Potentiometers are used as position sensors. They are contact-type sensors and lead to wear and noise. To overcome these drawbacks, non-contact type sensors are used. These sensors are based on inductive, capacitive, optical, and Hall Effect principles. Optical encoders provide good resolution but lead to higher cost and reliability related issues in the harsh/contaminated environment. Hall Effect sensors are sensitive to temperature and external magnetic fields. Capacitive sensors are very sensitive to extreme environmental changes.

Inductive sensors are used to convert a linear displacement or an angular motion of a conductive target into a proportional electrical signal using currents generated by a magnetic field induced in one or more sensing coils. Some inductive position sensors include at least one primary coil that sustains an oscillating signal producing a magnetic field and one or more secondary coils that receive the position information as currents induced by the magnetic field as a function of position of the conductive target.

Conventional inductive position sensors are expensive, and they occupy more space as the oscillator and sensor coils are radially wound on a core. Planar inductive position sensors are cost-effective as coils are laid out in a plane on a printed circuit board.

Planar inductive sensors consist of one or more oscillator coils, two sensing coils and one movable conductive target which influences the strength of magnetic coupling between the one or more oscillator coils and the sensing coils. An alternating current is induced through the one or more oscillator coils. The magnitude and phase of this alternating current depend on the position of the target. The eddy currents through the conductive target cause a difference in sense coil currents and voltages. Attempts are made to configure the sensing coils such that in a uniform magnetic field not influenced by a conductive target the voltages and currents induced in the sensing coils cancel each other out.

A few examples of prior-art planar inductive position sensors include United States Patent Publication US 20050253576, U.S. Pat. Nos. 4,507,638, 6,522,128, 7,196,604, and WO2002097374. A planar inductive sensor having two sensing coils and a pair of oscillator coils wrapped around the sensing coils is disclosed in Application Note AN-S1412 "Inductive Sensor Coil Design Using LX3301A" (2017) from Microsemi Corporation of Chandler Ariz.

One drawback of available linear inductive planar position sensors is that there is always a non-uniform magnetic field that exists at the edges of the sensor. This non-uniform magnetic field at the edges of the sensor causes an offset voltage to be induced in the sensing coils, which negatively effects the accuracy of sensor.

Generally, edge effects in linear sensors can be minimized by placing the sensing coils far away from oscillator coil edges, but this technique is not feasible in space-constrained applications because it increases the sensor printed circuit board size.

Referring first of all to FIG. 1, a diagram shows an example of a prior-art planar inductive linear position sensor 8 formed on a substrate 10, including an oscillator coil having a pair of oscillator coil segments 12 and 14 driven from a center tap, a sine sensing coil formed from two 360° segments 16a and 16b, the segment 16a starting from the left side of FIG. 1 at 0° (sin 0°=0) and the segment 16b starting from the left side of FIG. 1 at 0° (−sin 0°=0) and joined at their end points 42, 44, a cosine sensing coil formed from two segments of opposing phase shown in dashed lines at reference numerals 18a and 18b, the segment 18a starting from the left side of FIG. 1 at 0° (cos 0°=1) and the segment 18b starting from the left side of FIG. 1 at 0° (−cos 0°=−1) and joined at their ends by segments 46, 48, a movable conductive target 20. The movable target 20 is formed from a conductive material and is preferably formed from a material having a relatively high electrical conductivity, such as copper or aluminum. The sine sensing coil 16a and 16b is shown having leads 22 and 24 and the cosine sensing coil 18a and 18b is shown having leads 26 and 28.

Persons of ordinary skill in the art will appreciate that while the particular prior-art configuration shown in FIG. 1 employs a pair of oscillator coils 12 and 14 that may be conveniently formed from a single coil center tapped at reference numeral 30 from which it is driven by a signal Vin and having end leads 32 and 34, other prior art configurations employ a single oscillator coil driven by a suitable signal generator.

As is known in the art, the pair of oscillator coils 12 and 14, the sine sensing coil segments 16a and 16b, and the cosine sensing coil segments 18a and 18b can be formed as separate layers on multilayer substrate 10 using conventional printed circuit board fabrication techniques.

The oscillator signals may be generated by and the sensed signals may be received and processed by sensor interface circuitry, for example, a single sensor interface integrated circuit 36 such as a LX3301A Inductive Sensor Interface integrated circuit, available from Microsemi Corporation of Chandler, Ariz. Such a sensor interface circuit can include a signal generator section 36a used to generate the oscillator signal that is injected into the one or more oscillator coils, and sensing circuits 36b and 36c for sensing signals from the sine and cosine sensing coils, respectively. Capacitors 38 and 40 are coupled, respectively, between the end leads 32 and 34 of the oscillator coils 12 and 14 and ground to form LC resonant circuits. A typical value for capacitors 38 and 40 can be about 1.2 nF. The oscillator signal shown as Vin injected into the oscillator coil segments 12 and 14, ends of which are shown in FIG. 1 connected to the signal generator section 36a of the inductive sensor interface integrated circuit 36 at connections Osc. 1 and Osc. 2, respectively, is preferably a sine wave and the frequency of the oscillator signals injected into the oscillator coils depends only on the inductance of the oscillator coils 12, 14 and the respective capacitance values of capacitors 38 and 40. A typical, non-limiting oscillator frequency range can be between about 1 MHz and about 6 MHz.

The voltage induced by the movable conductive target 20 in one of the sine or cosine sensing coils is a time-dependent derivative of the magnetic flow from Maxwell's equation $$E = -\frac{d\varphi B}{dt}$$

Faraday's law of induction makes use of the magnetic flux ΦB through a region of space enclosed by a wire loop. The magnetic flux is defined by a surface integral $$\emptyset_B = \int B \cdot dA \qquad 5$$

An alternating current Io(t) is applied to the oscillator coil segments 12, 14 that creates an alternating magnetic field Bt(t). The alternating magnetic field Bo(t) induces in the movable conductive target 20, which in a simplified form is a closed conductive loop, a current It(t) that, in turn, creates an alternating magnetic field Bt(t) that opposes the exciting alternating magnetic field Bt(t).

A voltage is induced in each of the sine and cosine sensing coils from the overlapping alternating magnetic fields Bo(t)+Bt(t) according to the relationship $$E = -\frac{d\emptyset}{dt} = -\frac{d\int\int((B_0(t, x, y) - B_{t(t,x,y)})dA}{dt} =$$
$$-\frac{d}{dt}\int\int(B_0(t, x, y)dA + \frac{d}{dt}\int\int(B_t(t, x, y))dA$$

with A representing a surface area of the respective sensing coil.

It should be noted that each of the sensing coils have two surfaces, a positive lobe and a negative lobe, directed in opposite directions. The voltage induced in the positive lobe is Ep and the voltage induced in the negative lobe is En. The result is that, with a sine sensing coil having a symmetrical coil geometry as seen easily in FIG. 2, the portion of the induced voltage that is caused by the oscillator coil segments 12, 14 is zero; that is $$\frac{d}{dt}\int\int B_0(t, x, y))dA = 0$$

i.e., $E_p - E_n = 0$

When a current carrying conductor is placed in parallel with another conductor, there will be a magnetic coupling between the two conductors, resulting in additional induced voltage. Because the ends of the sine sensing coil segments 16a and 16b closest to the end portions of the oscillator coil segments 12, 14 are joined together at points 42 and 44 they present very little, if any, conductors having significant lengths that are close enough to form parallel conductors that will magnetically couple with the conductors forming the end portions of the oscillator coils 12 and 14.

In the case of the cosine sensing coil segments 18a and 18b there is always an edge effect resulting from its end segments 46 and 48 which are provided to connect the cosine segments 18a and 18b together at their ends, as can be seen in FIG. 3. These end segments 46 and 48 are oriented in parallel with the conductors that form end portions of the oscillator coils 12 and 14, and will be magnetically coupled to the conductors that form end portions of the oscillator coils 12 and 14. This coupling results in additional induced voltage (Ep+ΔEp) being coupled into the positive lobes of the cosine coils 18a and 18b from the oscillator coils 12 and 14 compared to voltage (En) induced in the negative lobe of the cosine sensing coil 18a and 18b. Because of this always there is an offset voltage ΔEp induced in cosine sensing coil, which means $$\frac{d}{dt}\int\int B_0(t, x, y)dA \neq 0$$

i.e., $(E_p + \Delta E_p) - E_n \neq 0$

The asymmetrically produced voltage on the cosine sensing coil adds the offset voltage to the voltage coupled in from the movable target. This creates difficulties for further processing the signal and introduces substantial measuring errors.

FIG. 4 is an amplitude vs. position plot of demodulated waveforms from the planar inductive linear position sensor 8 of FIG. 1, showing the waveform 50 sensed from the sine sensing coil 16a and 16b and the waveform 52 sensed from the cosine sensing coil 18a and 18b of the sensor of FIG. 1. As can be seen from FIG. 4, there is an induced offset voltage indicated at reference numeral 54 in the demodulated cosine waveform 52 of FIG. 4.

BRIEF DESCRIPTION

According to the present invention a linear inductive planar position sensor provides high accuracy linear position by compensating for edge effects within optimal space structure. Edge effects are cancelled by configuring the length of the oscillator coils to lie inside the lengthwise edges of the sensing coils. Minimal space structure has the benefit of reduced cost because of smaller printed circuit board size. The linear inductive planar position sensor of the present invention can also be implemented in multi-layered printed circuit boards.

The linear inductive planar position sensor of the present invention is robust because it has no moving electrical contacts, has good performance with respect to temperature, and has a high immunity to dust. The linear inductive planar position sensor of the present invention is an absolute position sensing device, which mean that it does not require motion at power-up to determine position.

The linear inductive planar position sensor of the present invention provides better accuracy and space utilization when compared to traditional planar position sensors. The linear inductive planar position sensor of the present invention fits in space-constrained and price-sensitive applications. Applications include brake pedals, level sensing and actuators, etc.

The linear inductive planar position sensor of the present invention provides improved accuracy within a given space by cancellation of edge effects.

As with the prior-art linear inductive planar position sensors, high-frequency AC carrier signals are injected into the one or more oscillator coils.

According to an aspect of the invention, a planar linear inductive position sensor is formed on a substrate and includes at least one oscillating coil. A first sensing coil has opposing edges extending beyond opposing edges of the oscillating coil along a linear axis along which a linear position of a conductive target is to be sensed. A second sensing coil has opposing edges extending beyond opposing edges of the oscillating coil along the linear axis. The first and second sensing coils have geometries selected such that equal opposing magnetic fields are induced in the first and second sensing coils in the presence of a magnetic field generated by the oscillating coil when no conductive target is proximate to the first and second sensing coils and unequal opposing magnetic fields are induced in the first and second sensing coils when the conductive target is proximate to the first and second sensing coils, a difference in the unequal opposing magnetic fields induced in the first and second sensing coils correlated to the position of the conductive target.

According to an aspect of the invention, the substrate is a printed circuit board.

According to an aspect of the invention, the oscillator coil is shaped as a rectangle, a long side of the rectangle aligned in the direction of travel of the conductive target to be sensed.

According to an aspect of the invention, the first sensing coil is formed as a first segment having the shape of a 360° cycle of a sine function sin x starting at 0° and a second segment having the shape of a 360° cycle of a sine function −sin x starting at 0°, both the first and second segments sharing a common axis, first ends of the first and second segments of the first sensing coil meet at and are electrically connected to each other at a first location along the common axis, and second ends of the first and second segments meet at and are electrically connected to each other at a second location along the common axis, the second sensing coil is formed as a first segment having the shape of a 360° cycle of a cosine function cos x starting at 0° and an opposing second segment having the shape of a 360° cycle of a cosine function cos x starting at 0°, both the first and second segments of the second sensing coil sharing the common axis. First ends of the first and second segments of the second sensing coil are electrically connected to each other and second ends of the first and second segments of the second sensing coil are electrically connected to each other. A linear position of the target is sensed as positions along the common axis.

According to an aspect of the invention, the at least one oscillating coil is formed as a center-tapped coil having two segments.

According to an aspect of the invention, the opposing edges of the first and second sensing coils each extend beyond opposing edges of the oscillating coil along the linear axis by an amount selected to cancel a no-target-present offset voltage induced at the opposing edges of the second sensing coil.

According to an aspect of the invention, a planar linear inductive position sensor system is formed on a substrate and includes at least one oscillating coil. A first sensing coil has opposing edges extending beyond opposing edges of the oscillating coil along a linear axis along which a linear position of a conductive target is to be sensed. A second sensing coil has opposing edges extending beyond opposing edges of the oscillating coil along the linear axis. The first and second sensing coils have geometries selected such that equal opposing magnetic fields are induced in the first and second sensing coils in the presence of a magnetic field generated by the oscillating coil when no conductive target is proximate to the first and second sensing coils and unequal opposing magnetic fields are induced in the first and second sensing coils when the conductive target is proximate to the first and second sensing coils, a difference in the unequal opposing magnetic fields induced in the first and second sensing coils correlated to the position of the conductive target. A capacitor is coupled to the oscillating coil to form a resonant LC circuit at a resonant frequency. A signal generator generates a signal at the resonant frequency coupled to the oscillator coil, and sensor circuits are coupled to the first and second sensing coils.

According to an aspect of the invention, the first sensing coil is formed as a first segment having the shape of a 360° cycle of a sine function sin x starting at 0° and an opposing second segment having the shape of a 360° cycle of a sine function sin x starting at 0°, both the first and second segments sharing a common axis, first ends of the first and second segments of the first sensing coil meet at and are electrically connected to each other, and second ends of the first and second segments meet at and are electrically connected each other. The second sensing coil is formed as a first segment having the shape of a 360° cycle of a cosine function cos x starting at 0° and an opposing second segment having the shape of a 360° cycle of a cosine function −cos x starting at 0°. Both the first and second segments of the second sensing coil share the common axis. First ends of the first and second segments of the second sensing coil are electrically connected to each other, second ends of the first and second segments of the second sensing coil are electrically connected to each other. The linear position of the target is sensed as positions along the common axis.

According to an aspect of the invention, a method for detecting the linear position of a conductive target with respect to a substrate includes providing an oscillating coil on the substrate, providing first and second sensing coils on the substrate, the first and second sensing coils having geometries selected such that equal opposing magnetic fields are induced in the first and second sensing coils in the presence of a magnetic field generated by the oscillating coil when no conductive target is proximate to the first and second sensing coils and unequal opposing magnetic fields are induced in the first and second sensing coils when the conductive target is proximate to the first and second sensing coils, a difference in the unequal opposing magnetic fields induced in the first and second sensing coils correlated to the position of the conductive target, the provided first and second sensing coils having opposing edges extending beyond opposing edges of the oscillating coil along a linear axis along which the linear position of the conductive object is to be sensed, exciting the oscillating coil with a generated oscillator signal, measuring voltages induced in the first and second sensing coils from the generated oscillator signal, and determining presence and position of the conductive target as a function of a difference in the voltages induced in the first and second sensing coils.

According to an aspect of the invention, providing an oscillating coil on the substrate includes providing a resonant circuit including the oscillating coil and a capacitor, the resonant circuit having a resonant frequency, and exciting the oscillating coil with a generated oscillator signal includes exciting the oscillating coil with a generated oscillator signal at the resonant frequency.

According to an aspect of the invention, providing first and second sensing coils on the substrate includes providing the first sensing coil formed as a first segment having the shape of a 360° cycle of a sine function sin x starting at 0° and an opposing second segment having the shape of a 360° cycle of a sine function sin x starting at 0°, both the first and second segments sharing a common axis. First ends of the first and second segments meet at and are electrically connected to each other at a first location along the common axis, and second ends of the first and second segments meet at and are electrically connected at a second location along the common axis. Providing the second sensing coil formed as a first segment having the shape of a 360° cycle of a cosine function cos x starting at 0° and an opposing second segment having the shape of a 360° cycle of a cosine function cos x starting at 0°, both the first and second segments of the second sensing coil sharing the common axis, first ends of the first and second segments of the second sensing coil are electrically connected to each other, and second ends of the first and second segments are electrically connected to each other.

BRIEF DESCRIPTION OF THE DRAWING FIGURES

The invention will be explained in more detail in the following with reference to embodiments and to the drawing in which are shown:

DETAILED DESCRIPTION

Persons of ordinary skill in the art will realize that the following description is illustrative only and not in any way limiting. Other embodiments will readily suggest themselves to such skilled persons.

Figure 5:
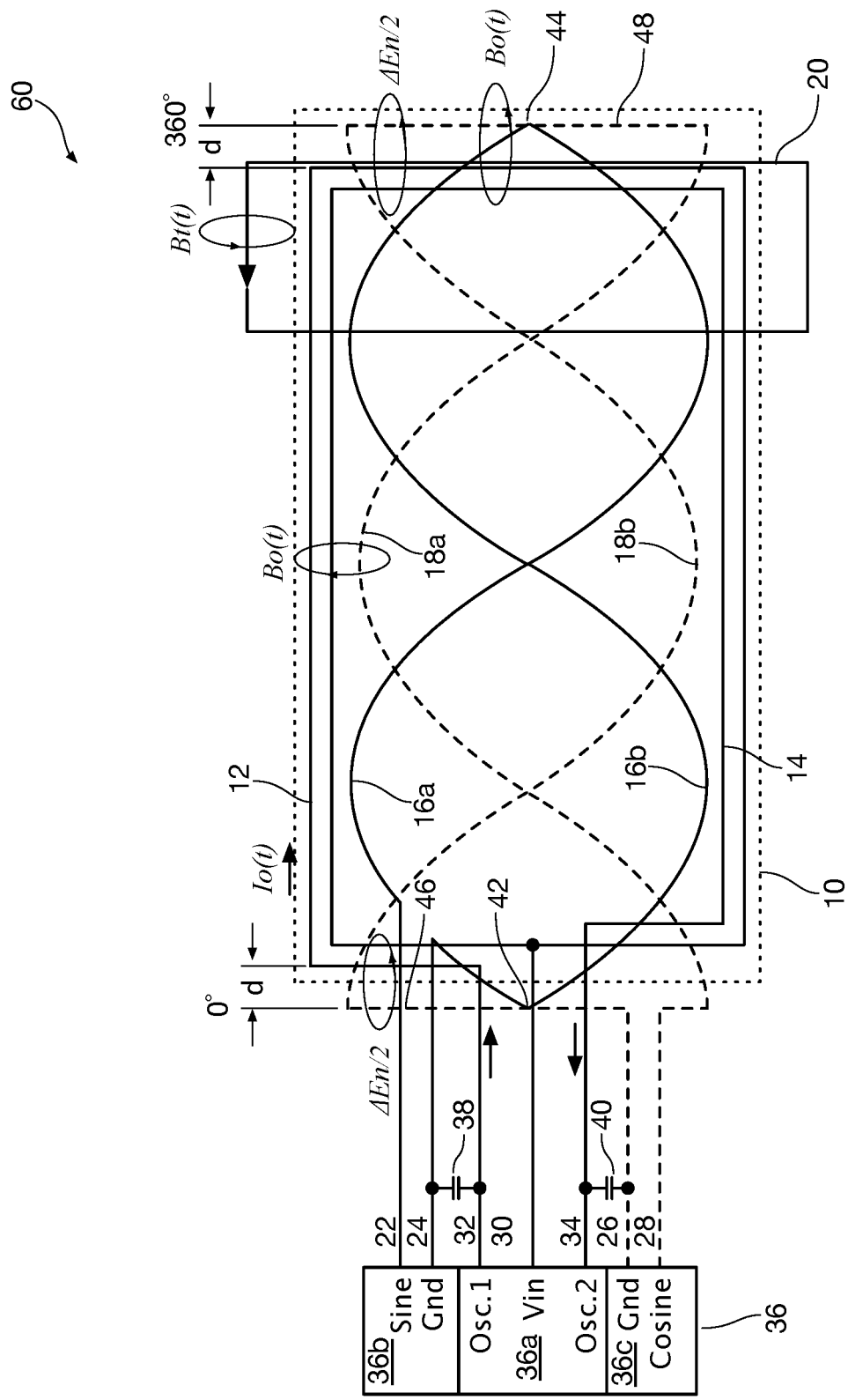
FIG. 5 is a drawing depicting a linear inductive planar position sensor in accordance with the present invention.

Referring now to FIG. 5, a diagram shows a linear inductive planar position sensor 60 in accordance with the present invention. The planar inductive linear position sensor 60 of FIG. 5 includes elements present in the prior-art planar inductive linear position sensor 8 of FIG. 1. These elements will be referred to in FIG. 5 using the same reference numerals used to identify these elements in FIG. 1 although the relative geometries of these elements differ in accordance with the principles of the present invention.

The planar inductive linear position sensor 60 of FIG. 5 includes a center-tapped oscillator coil having a pair of oscillator coil segments 12 and 14. The oscillator coil is preferably rectangularly shaped, a long side of the rectangle aligned in the direction of travel of a movable conductive target 20 to be sensed by the planar inductive linear position sensor 60. A sine sensing coil is formed from two complementary 360° sine function segments (sin x and −sin x both starting at 0°, where sin 0°=−sin 0°=0) 16a and 16b, and a cosine sensing coil is formed from two complementary 360° cosine function segments cos x and −cos x both starting at 0°, where cos 0°=1 and −cos 0°=−1) shown in dashed lines at reference numerals 18a and 18b. The movable target 20 is formed from a conductive material and is preferably formed from a material having a relatively high electrical conductivity, such as copper or aluminum. As is known in the art, the pair of oscillator coils 12 and 14, the sine sensing coil segments 16a and 16b, and the cosine sensing coil segments 18a and 18b can be formed as separate layers on a multilayer substrate 10 using conventional printed circuit board fabrication techniques.

The sine sensing coil is shown having leads 22 and 24 and the cosine sensing coil is shown having leads 26 and 28. The pair of oscillator coils 12 and 14 may be formed from a single coil having a center tap at reference numeral 30 from which it is driven and end leads 32 and 34. The oscillator signals may be generated by and the sensed signals may be received and processed by sensor interface circuitry, for example, a single sensor interface integrated circuit 36 such as a LX3301A Inductive Sensor Interface integrated circuit, available from Microsemi Corporation of Chandler, Ariz. Such a sensor interface circuit 36 can include a signal generator section 36a used to generate the oscillator signal that is injected into the one or more oscillator coils, and sensing circuits 36b and 36c for sensing signals from the sine and cosine sensing coils, respectively. Capacitors 38 and 40 are coupled, respectively, between the end leads 32 and 34 of the oscillator coils 12 and 14 and ground to form LC resonant circuits. A typical value for capacitors 38 and 40 can be about 1.2 nF. The oscillator signal injected into the oscillator coils 12 and 14 is preferably a sine wave and the frequency of the oscillator signals injected into the oscillator coils depends only on the inductance of the oscillator coils and the respective capacitance values of capacitors 38 and 40. A typical, non-limiting oscillator frequency range can be between about 1 MHz and about 6 MHz.

Figure 1:
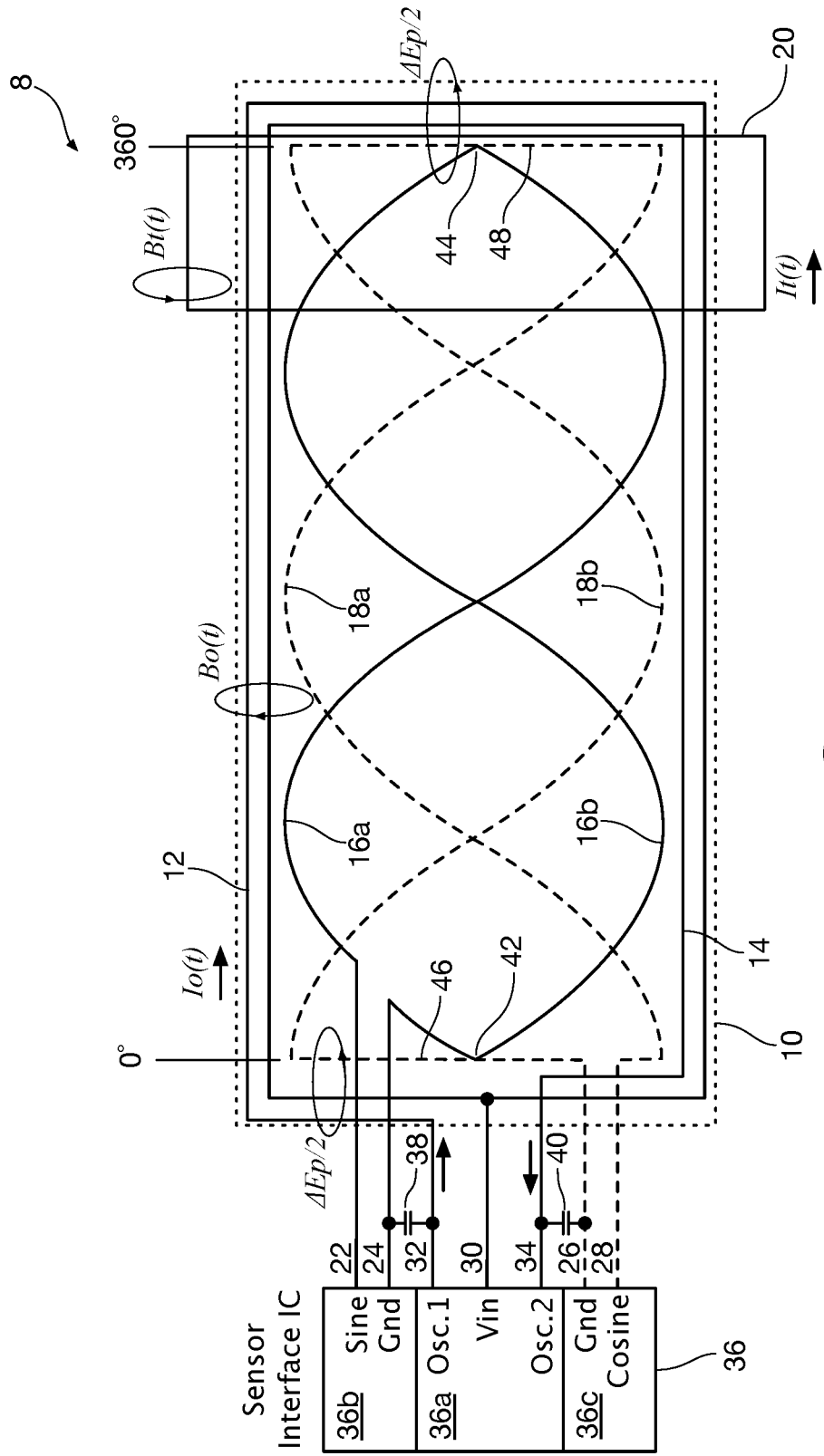
FIG. 1 is a drawing depicting a prior-art linear inductive planar position sensor.
Figure 2:
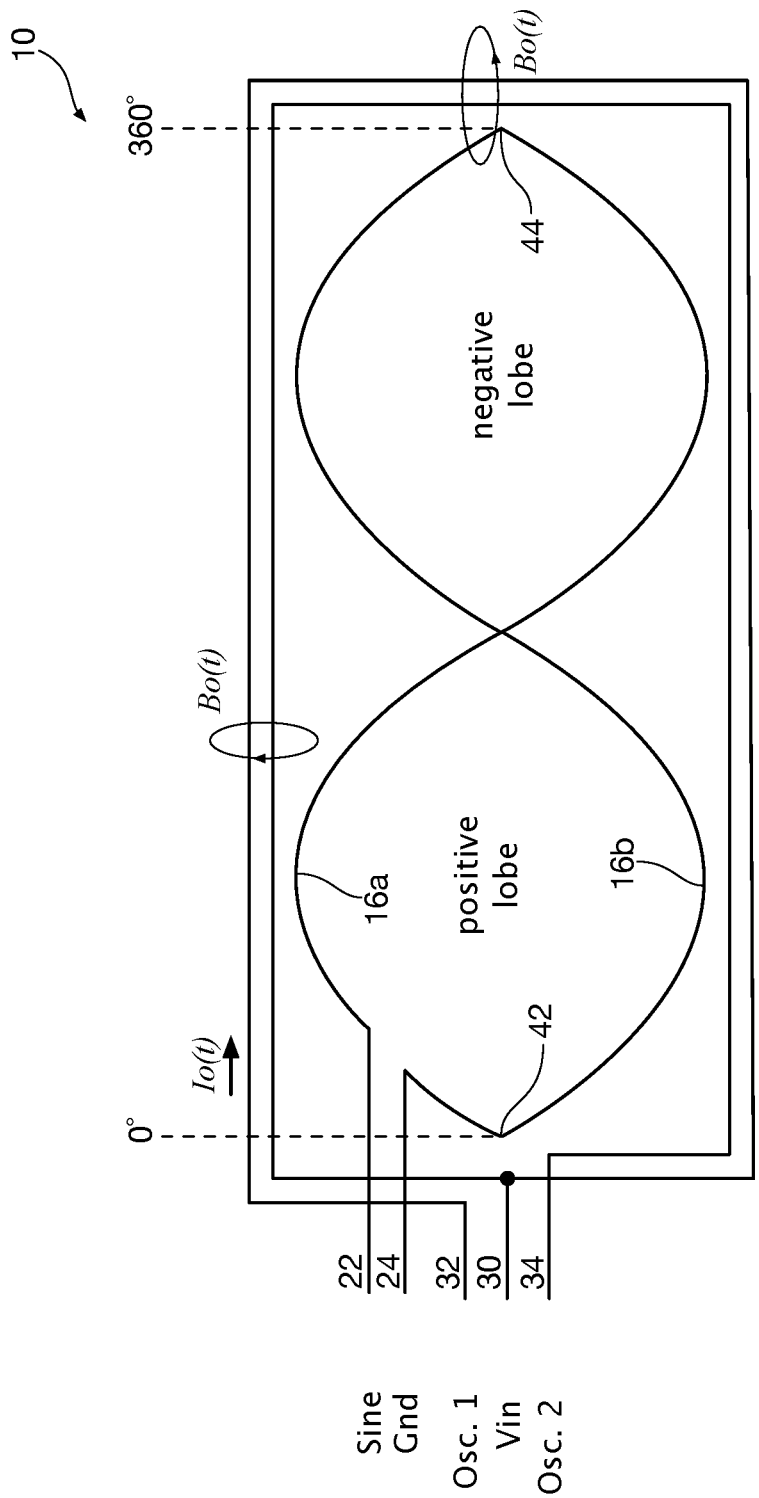
FIG. 2 is a drawing depicting the sine sensing coil portion of the prior-art linear inductive planar position sensor of FIG. 1.
Figure 3:
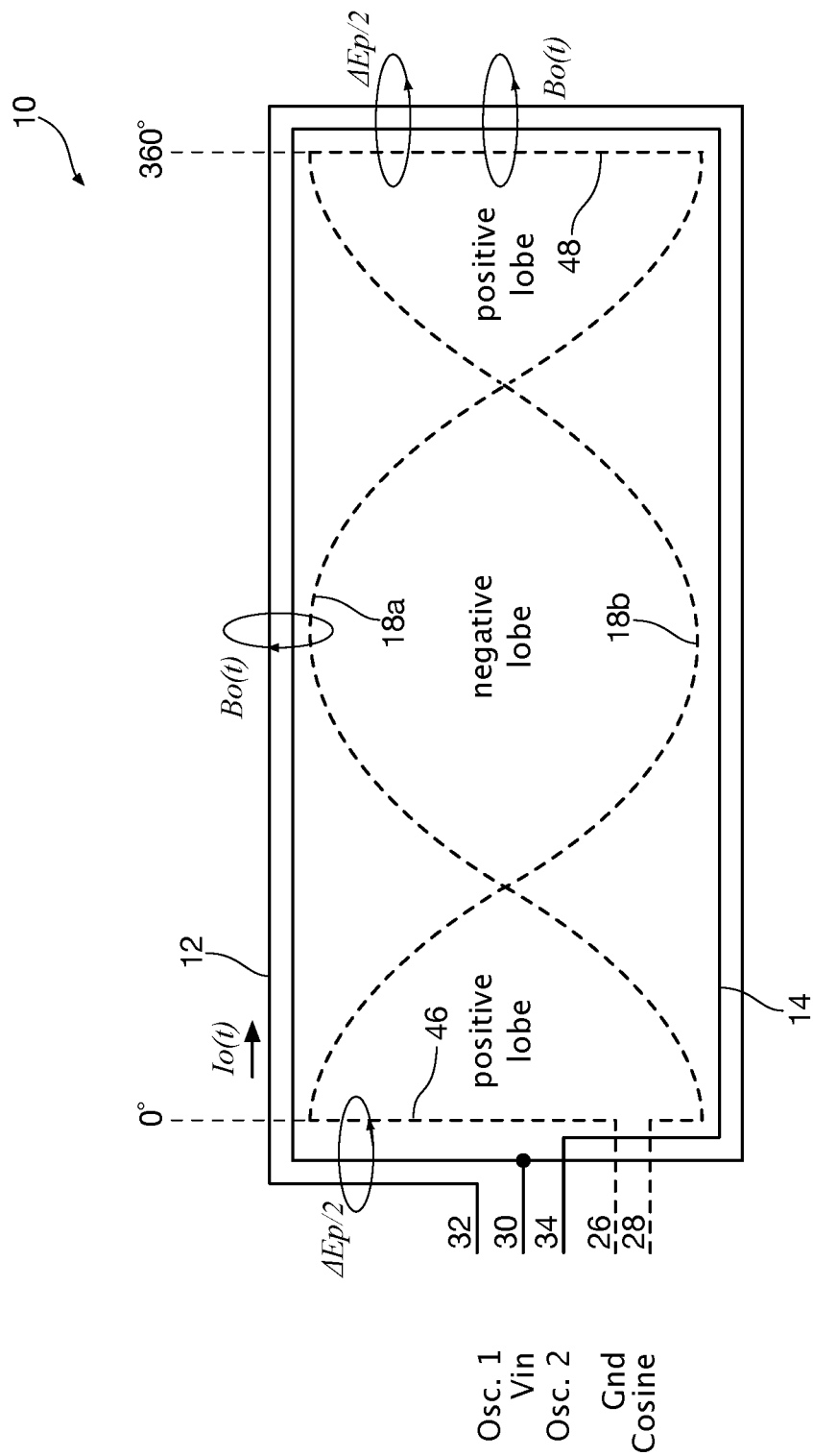
FIG. 3 is a drawing depicting the cosine sensing coil portion of the prior-art linear inductive planar position sensor of FIG. 1.
Figure 4:
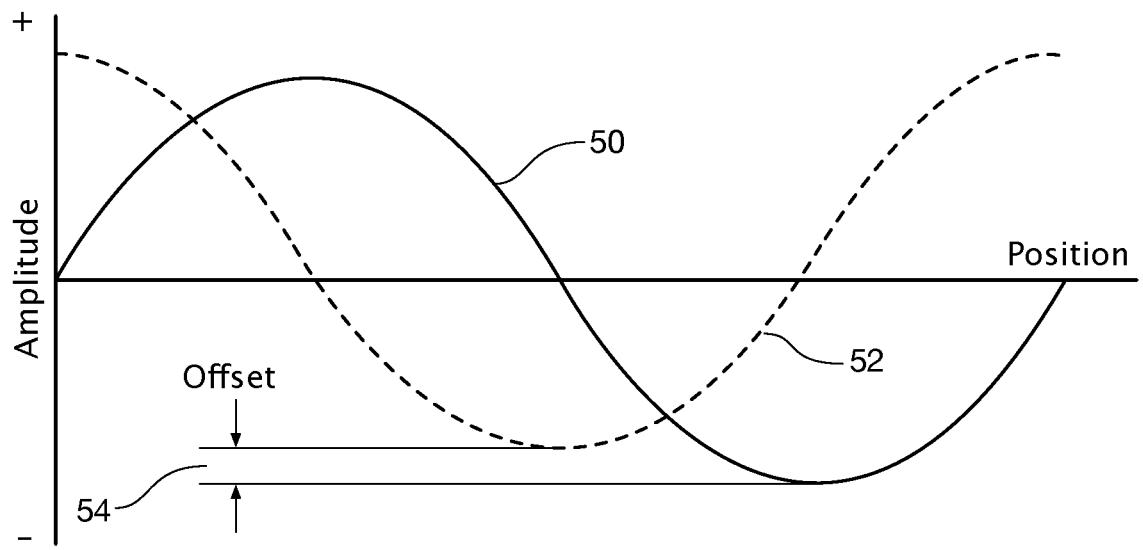
FIG. 4 is an amplitude vs. position plot of demodulated waveforms from the planar inductive linear position sensor of FIG. 1, showing the waveforms sensed from the sine and cosine sensing coils.

As in the prior-art planar inductive linear position sensor 8 of FIG. 1, the ends of the sine segments 16a and 16b closest to the end portions of the oscillator coils in the planar inductive linear position sensor 60 of FIG. 5 are joined together at points 42 and 44. Similarly, the ends of the cosine segments 18a and 18b are joined together at end segments 46 and 48.

As in the prior-art planar inductive linear position sensor 8 of FIG. 1, the ends of the sine sensing coil segments 16a and 16b closest to the end portions of the oscillator coils are joined together at points 42 and 44 and they present very little, if any, conductors having significant lengths that are close enough to form parallel conductors that will magnetically couple with the conductors forming the end portions of the oscillator coils 12 and 14.

In the planar inductive linear position sensor 60 of FIG. 5, the edge effect of the cosine sensing coil segments 18a and 18b resulting from its end segments 46 and 48 which are provided to connect the opposing cosine segments 18a and 18b together at their ends also induces a voltage ΔEp/2 at each end of the sensor. These voltages induced by the presence of the end segments 46 and 48 is compensated by canceling the additional induced voltage (Ep+ΔEp) coupled into the positive lobes of the cosine coils 18a and 18b from the oscillator coils 12 and 14. This is accomplished by shortening the oscillator coils 12 and 14 by a distance d as shown in FIG. 5 so that their outer edges lie inside the end segments 46 and 48 of the cosine sensing coil segments 18a and 18b. It is to be noted that d is defined in relation to end segments 46, 48 and not in relation to the placement of the prior art. This shortening induces an additional opposing offset voltage ΔEn/2 at each edge of the sensor. At the distance d, the magnitude of the additional opposing offset voltage ΔEn/2 is equal to and opposite from the offset voltage ΔEp/2 induced at the edges of the sensor when the movable target is not present. A zero-sum voltage results at output taps of the cosine sensing coils.

$$\frac{d}{dt}\int\int B_0(t,x,y)dA = 0$$

i.e., $(E_p + \Delta E_p) - (E_n + \Delta E_n) = 0$

The exact shortening of the oscillator coils in accordance with the present invention depends on the geometry of the individual sensor being compensated and must be determined for each individual case. The distance d by which the oscillator coils are displaced inwardly from the edges of the cosine coils depends on many factors including coil geometry and target size. The distance d should be tuned for each case to compensate the offset because the sensor is a very complex electromagnetic structure there is no direct mathematic relationship between d and the geometry of the sensor. As an example, in a sensor with cosine coils having a width of 55 mm using a target having a width of 10.5 mm, a distance d of 1.24 mm compensates for the offset error.

Figure 6:
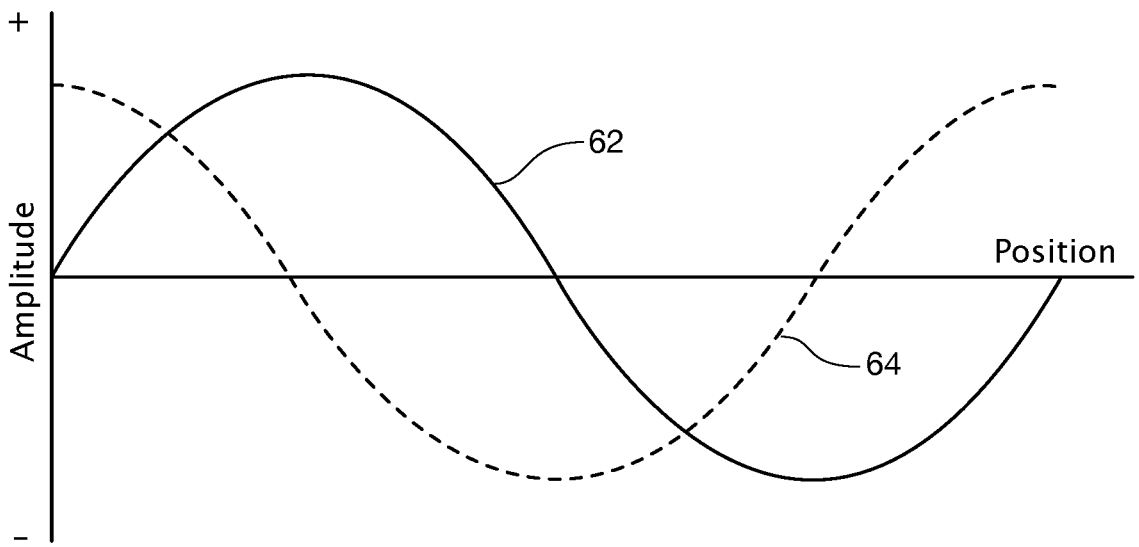
FIG. 6 is an amplitude vs. position plot of demodulated waveforms from the planar inductive linear position sensor of FIG. 5 with offset compensation in accordance with the present invention, showing the waveforms sensed from the sine and cosine sensing coils.

FIG. 6 is an amplitude vs. position plot of demodulated waveforms from the planar inductive linear position sensor 60 of FIG. 5 with offset compensation in accordance with the present invention, showing the waveforms sensed from the sine and cosine sensing coils. The waveform 62 is sensed from the sine sensing coil 16a and 16b and the waveform 64 is sensed from the cosine sensing coil 18a and 18b of the planar inductive linear position sensor 60 of FIG. 5. As can be seen from FIG. 5, there is no induced offset voltage in the demodulated cosine waveform 64 of FIG. 5.

Figure 7:
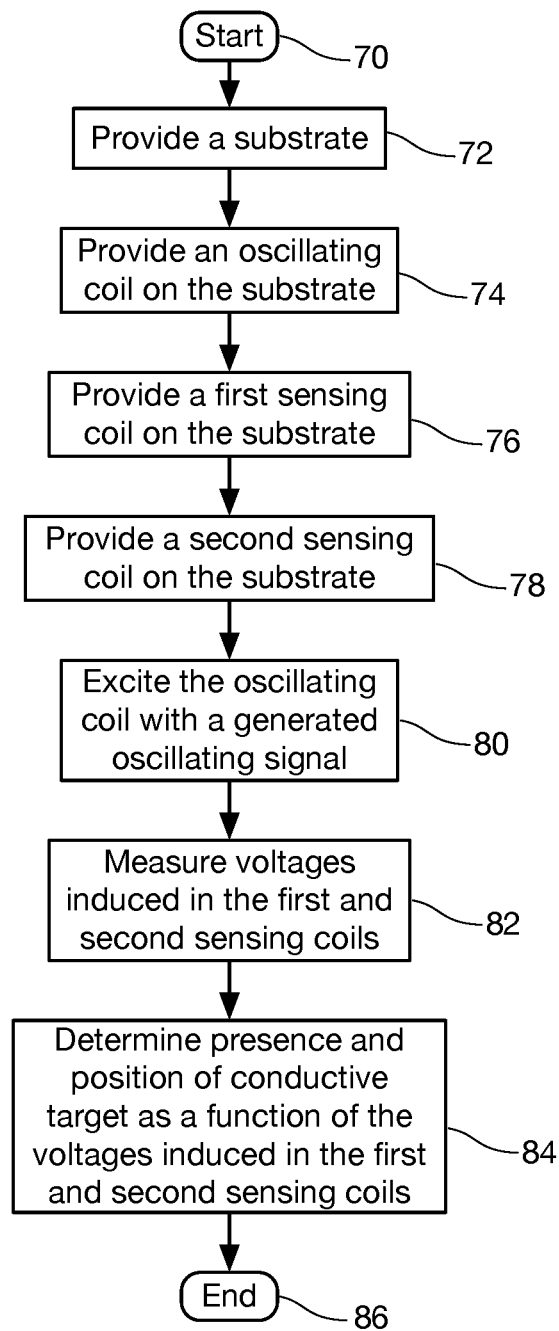
FIG. 7 is a flow diagram showing an illustrative method in accordance with the present invention.

Referring now to FIG. 7, a flow diagram shows an illustrative method in accordance with the present invention. The method begins at reference numeral 70. At reference numeral 72, a substrate is provided. At reference numeral 74, an oscillating coil is provided on the substrate. At reference numerals 76 and 78, first and second sensing coils are provided on the substrate, the first and second sensing coils having geometries selected such that equal opposing magnetic fields are induced in the first and second sensing coils in the presence of a magnetic field generated by the oscillating coil when no conductive target is proximate to the first and second sensing coils and unequal opposing magnetic fields are induced in the first and second sensing coils when the conductive target is proximate to the first and second sensing coils, a difference in the unequal opposing magnetic fields induced in the first and second sensing coils correlated to the position of the conductive target, the first and second sensing coils having opposing edges extending beyond opposing edges of the oscillating coil along a linear axis along which the linear position of the conductive target is to be sensed. At reference numeral 80, the oscillating coil is excited with a generated oscillator signal. At reference numeral 82, voltages induced in the first and second sensing coils from the generated oscillator signal are measured. At reference numeral 84, the presence and position of the conductive target are determined as a function of a difference in the voltages induced in the first and second sensing coils.

The method ends at reference numeral 86.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A planar linear inductive position sensor comprising:
   a substrate;
   at least one oscillating coil;
   a first sensing coil having opposing edges extending beyond opposing edges of the oscillating coil along a linear axis along which a linear position of a conductive target is to be sensed;
   a second sensing coil having opposing edges extending beyond opposing edges of the oscillating coil along the linear axis;
   the first and second sensing coils having geometries selected such that equal opposing magnetic fields are induced in the first and second sensing coils in the presence of a magnetic field generated by the oscillating coil when no conductive target is proximate to the first and second sensing coils and unequal opposing magnetic fields are induced in the first and second sensing coils when the conductive target is proximate to the first and second sensing coils, a difference in the unequal opposing magnetic fields induced in the first and second sensing coils correlated to the position of the conductive target.

2. The planar linear inductive position sensor of claim 1 wherein the substrate is a printed circuit board.

3. The planar linear inductive position sensor of claim 1 wherein the oscillating coil is shaped as a rectangle, a long side of the rectangle aligned in the direction of travel of the conductive target to be sensed.

4. The planar linear inductive position sensor of claim 1 wherein:
   the first sensing coil is formed as a first segment having the shape of a 360° cycle of a sine function sin x starting at 0° and a second segment having the shape of a 360° cycle of a sine function −sin x starting at 0°, both the first and second segments sharing a common axis, first ends of the first and second segments meeting at and electrically connected to each other at a first location along the common axis, and second ends of the first and second segments meeting at and electrically connected to each other at a second location along the common axis;
   the second sensing coil is formed as a first segment having the shape of a 360° cycle of a cosine function cos x starting at 0° and an opposing second segment having the shape of a 360° cycle of a cosine function cos x starting at 0°, both the first and second segments of the second sensing coil sharing the common axis, first ends of the first and second segments of the second sensing coil electrically connected to each other, and second ends of the first and second segments of the second sensing coil electrically connected to each other; and
   wherein a linear position of the conductive target is sensed as positions along the common axis.

5. The planar linear inductive position sensor of claim 1 wherein the at least one oscillating coil is formed as a center-tapped coil having two segments.

6. The planar linear inductive position sensor of claim 1 wherein the opposing edges of the first and second sensing coils each extend beyond opposing edges of the oscillating coil along the linear axis by an amount selected to cancel a no-target-present offset voltage induced at the opposing edges of the second sensing coil.

7. A planar linear inductive position sensor system comprising:
   a substrate;
   an oscillating coil;

a first sensing coil having opposing edges extending beyond opposing edges of the oscillating coil along a linear axis along which a linear position of a conductive target is to be sensed;

a second sensing coil having opposing edges extending beyond opposing edges of the oscillating coil along the linear axis;

the first and second sensing coils having geometries selected such that equal opposing magnetic fields are induced in the first and second sensing coils in the presence of a magnetic field generated by the oscillating coil when no conductive target is proximate to the first and second sensing coils and unequal opposing magnetic fields are induced in the first and second sensing coils when the conductive target is proximate to the first and second sensing coils, a difference in the unequal opposing magnetic fields induced in the first and second sensing coils correlated to the position of the conductive target;

a capacitor coupled to the oscillating coil to form a resonant LC circuit at a resonant frequency;

a signal generator generating a signal at the resonant frequency coupled to the oscillator coil; and sensor circuits coupled to the first and second sensing coils.

8. The planar linear inductive position sensor system of claim 7 wherein the substrate is a printed circuit board.

9. The planar linear inductive position sensor system of claim 7 wherein:

the first sensing coil is formed as a first segment having the shape of a 360° cycle of a sine function sin x starting at 0° and an opposing second segment having the shape of a 360° cycle of a sine function sin x starting at 0°, both the first and second segments sharing a common axis, first ends of the first and second segments of the first sensing coil meeting at and electrically connected to each another, and second ends of the first and second segments of the first sensing coil meeting at and electrically connected to each another;

the second sensing coil is formed as a first segment having the shape of a 360° cycle of a cosine function cos x starting at 0° and an opposing second segment having the shape of a 360° cycle of a cosine function –cos x starting at 0°, both the first and second segments of the second sensing coil sharing the common axis, first ends of the first and second segments of the second sensing coil electrically connected to each other, and second ends of the first and second segments of the second sensing coil are electrically connected to each other; and wherein linear position of the conductive target is sensed as positions along the common axis.

10. The planar linear inductive position sensor system of claim 7 wherein the oscillating coil is formed as a center-tapped coil.

11. The planar linear inductive position sensor system of claim 10 wherein the capacitor coupled to the oscillating coil to form a resonant LC circuit at a resonant frequency comprises:

a first capacitor coupled to a first end of the center-tapped coil; and a second capacitor coupled to a second end of the center-tapped coil.

12. The planar linear inductive position sensor system of claim 7 wherein the opposing edges of the first and second sensing coils each extend beyond opposing edges of the oscillating coil along the linear axis by an amount selected to cancel a no-target-present offset voltage induced at the opposing edges of the second sensing coil.

13. A method for detecting the linear position of a conductive target with respect to a substrate comprising:

providing an oscillating coil on the substrate;

providing first and second sensing coils on the substrate, the first and second sensing coils having geometries selected such that equal opposing magnetic fields are induced in the first and second sensing coils in the presence of a magnetic field generated by the oscillating coil when no conductive target is proximate to the first and second sensing coils and unequal opposing magnetic fields are induced in the first and second sensing coils when the conductive target is proximate to the first and second sensing coils, a difference in the unequal opposing magnetic fields induced in the first and second sensing coils correlated to the position of the conductive target, the provided first and second sensing coils having opposing edges extending beyond opposing edges of the oscillating coil along a linear axis along which the linear position of the conductive target is to be sensed;

exciting the oscillating coil with a generated oscillator signal;

measuring voltages induced in the first and second sensing coils from the generated oscillator signal; and determining presence and position of the conductive target as a function of a difference in the voltages induced in the first and second sensing coils.

14. The method of claim 13 wherein providing an oscillating coil on the substrate comprises providing a resonant circuit including the oscillating coil and a capacitor, the resonant circuit having a resonant frequency; and exciting the oscillating coil with a generated oscillator signal comprises exciting the oscillating coil with a generated oscillator signal at the resonant frequency.

15. The method of claim 13 wherein providing first and second sensing coils on the substrate comprises:

providing the first sensing coil formed as a first segment having the shape of a 360° cycle of a sine function sin x starting at 0° and an opposing second segment having the shape of a 360° cycle of a sine function sin x starting at 0°, both the first and second segments sharing a common axis, first ends of the first and second segments of the first sensing coil meeting at and electrically connected to each other, and second ends of the first and second segments of the first sensing coil meeting at and electrically connected to each other; and providing the second sensing coil formed as a first segment having the shape of a 360° cycle of a cosine function cos x starting at 0° and an opposing second segment having the shape of a 360° cycle of a cosine function cos x starting at 0°, both the first and second segments of the second sensing coil sharing the common axis, first ends of the first and second segments of the second sensing coil electrically connected to each other, and second ends of the first and second segments electrically connected to each other.

\* \* \* \* \*